United States Patent
Kumar et al.

(10) Patent No.: US 11,270,429 B2
(45) Date of Patent: Mar. 8, 2022

(54) METHOD AND SYSTEM FOR IMPURITY DETECTION USING MULTI-MODAL IMAGING

(71) Applicant: Tata Consultancy Services Limited, Mumbai (IN)

(72) Inventors: Achanna Anil Kumar, Bangalore (IN); Rishab Khawad, Bangalore (IN); Riddhi Panse, Bangalore (IN); Andrew Gigie, Bangalore (IN); Tapas Chakravarty, Kolkata (IN); Kriti Kumar, Bangalore (IN); Saurabh Sahu, Bangalore (IN); Mariswamy Girish Chandra, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 161 days.

(21) Appl. No.: 16/900,106

(22) Filed: Jun. 12, 2020

(65) Prior Publication Data
US 2021/0019876 A1 Jan. 21, 2021

(30) Foreign Application Priority Data
Jun. 13, 2019 (IN) .............................. 201921023526

(51) Int. Cl.
*G06T 7/00* (2017.01)
*G01N 21/88* (2006.01)

(52) U.S. Cl.
CPC ....... *G06T 7/0008* (2013.01); *G01N 21/8803* (2013.01); *G01N 21/8851* (2013.01); *G01N 2021/8864* (2013.01); *G06T 2207/10024* (2013.01)

(58) Field of Classification Search
CPC ......... G06T 7/0008; G06T 2207/10024; G06T 2207/20072; G06T 2207/30164; G06T 7/11; G06T 7/187; G01N 21/8803; G01N 21/8851; G01N 2021/8864
USPC ....................................................... 382/141
See application file for complete search history.

(56) References Cited

U.S. PATENT DOCUMENTS

2016/0261844 A1 9/2016 Kadambi et al.
2018/0108141 A1* 4/2018 Chen ........................ G06T 7/50

OTHER PUBLICATIONS

Miguel Ángel Martínez-Domingo, Eva M. Valero, Javier Hernández-Andrés, Shoji Tominaga, Takahiko Horiuchi, and Keita Hirai, "Image processing pipeline for segmentation and material classification based on multispectral high dynamic range polarimetric images," Opt. Express 25, 30073-30090 (2017) (Year: 2017).*
Tominaga, S. et al. (Dec. 2008). "Polarization imaging for material classification," *Optical Engineering*, vol. 47, No. 12; pp. 123201-1-123201-14.

* cited by examiner

*Primary Examiner* — Amandeep Saini
(74) *Attorney, Agent, or Firm* — Finnegan, Henderson, Farabow, Garrett & Dunner, LLP (57) ABSTRACT

The disclosure herein generally relates to image processing, and, more particularly, to a method and system for impurity detection using multi-modal image processing. This system uses a combination of polarization data, and at least one of a depth data and an RGB image data to perform the impurity material detection. The system uses a graph fusion based approach while processing the captured images to detect presence of the impurity material, and accordingly alert the user.

9 Claims, 10 Drawing Sheets

METHOD AND SYSTEM FOR IMPURITY DETECTION USING MULTI-MODAL IMAGING

PRIORITY CLAIM

The present application claims priority from Indian provisional patent application no. 201921023526, filed on Jun. 13, 2019. The entire contents of the aforementioned application are incorporated herein by reference.

TECHNICAL FIELD

The disclosure herein generally relates to image processing, and, more particularly, to a method and system for impurity detection using multi-modal image processing.

BACKGROUND

In industrial processing and in other such applications in which processing of raw materials is involved, one important requirement is that the raw materials being processed is pure and impurity free, so as to improve quality of output, and to also make sure that the equipment/machinery used for the raw material processing are not damaged (which can happen if impurity materials are present). For example, if the impurities are big, then they may not be crushed by the subsequent stages of processing, and this may lead to system tripping and it may take a few hours to get the system back to functioning mode. This can cause huge losses to the industry. Detection and localization of foreign particles mixed with any homogeneous background material/raw material like coal in real-time with very low latency hence is a major requirement. Such particles going unnoticed can adversely affect the performance of any system/machine that processes the materials.

The inventors here have recognized several technical problems with such conventional systems, as explained below. As manual inspection of the materials is a cumbersome and error-prone task, there are various systems that are designed to perform impurity/foreign particle detection. Some of the state of the art systems rely on image processing based techniques for the impurity detection purpose. Current image-processing based technologies in the domain of impurity detection rely on RGB (Red-Green-Blue) and RGB-D (Depth) image processing algorithms which segment out the image and formulate the contour. However these techniques have limitations with respect to background and foreground check and identification of the native material and impurities.

SUMMARY

Embodiments of the present disclosure present technological improvements as solutions to one or more of the above-mentioned technical problems recognized by the inventors in conventional systems. For example, in one embodiment, a method of image processing for impurity identification is provided. In this method, initially, an RGB-P image and at least one of an RGB image, and RGB-D image, of a scene, are obtained as inputs, via the one or more hardware processors. Further, the obtained RGB-P image and the at least one RGB and RGB-D image are pre-processed to remove motion blur, via the one or more hardware processors. Further, a Degree of Polarization (DoP) map is generated from at least one plane of the RGB-P image, via the one or more hardware processors. Then, a first graph and at least one of a second graph and a third graph are constructed, via the one or more hardware processors, wherein the first graph is constructed for the DoP map, the second graph is constructed for the RGB image, and the third graph is constructed for the RGB-D image. Further, a joint graph spectrum is constructed by merging the first graph, and the at least one of the second graph and the third graph, via the one or more hardware processors. Further, a spectral clustering using the joint graph spectrum is performed. During the spectral clustering, a plurality of segments are generated from the joint graph spectrum, and then values of each of the plurality of segments are mapped from the DoP map. Further, based on size of the segments and the values of each of the segments, presence or absence of one or more impurity materials in the scene is determined, via the one or more hardware processors.

In another aspect, a system of image processing for impurity identification is provided. The system includes one or more hardware processors, one or more communication interfaces, and a memory. The memory includes a plurality of instructions, which when executed, cause the one or more hardware processors to obtain an RGB-P image and at least one of an RGB image, and RGB-D image, of a scene, as inputs. The system then pre-processes the obtained RGB-P image and the at least one RGB and RGB-D image to remove motion blur. The system then generates a Degree of Polarization (DoP) map from at least one plane of the RGB-P image. The system further constructs a first graph and at least one of a second graph and a third graph, wherein the first graph is constructed for the DoP map, the second graph is constructed for the RGB image, and the third graph is constructed for the RGB-D image. The system then constructs a joint graph spectrum by merging the first graph, and the at least one of the second graph and the third graph. Further, a spectral clustering using the joint graph spectrum is performed. During the spectral clustering, a plurality of segments are generated from the joint graph spectrum, and then values of each of the plurality of segments are mapped from the DoP map. Further, based on size of the segments and the values of each of the segments, presence or absence of one or more impurity materials in the scene is determined.

In yet another aspect, a non-transitory computer readable medium for image processing based impurity identification is provided. The non-transitory computer readable medium comprises a plurality of instructions, which when executed, cause the one or more hardware processors to perform steps in the following method for impurity identification. In this method, initially, an RGB-P image and at least one of an RGB image, and RGB-D image, of a scene, are obtained as inputs, via the one or more hardware processors. Further, the obtained RGB-P image and the at least one RGB and RGB-D image are pre-processed to remove motion blur, via the one or more hardware processors. Further, a Degree of Polarization (DoP) map is generated from at least one plane of the RGB-P image, via the one or more hardware processors. Then, a first graph and at least one of a second graph and a third graph are constructed, via the one or more hardware processors, wherein the first graph is constructed for the DoP map, the second graph is constructed for the RGB image, and the third graph is constructed for the RGB-D image. Further, a joint graph spectrum is constructed by merging the first graph, and the at least one of the second graph and the third graph, via the one or more hardware processors. Further, a spectral clustering using the joint graph spectrum is performed. During the spectral clustering, a plurality of segments are generated from the joint graph spectrum, and then values of each of the plurality of segments are mapped from the DoP map. Further, based on size of the segments and the values of each of the segments, presence or absence of one or more impurity materials in the scene is determined, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
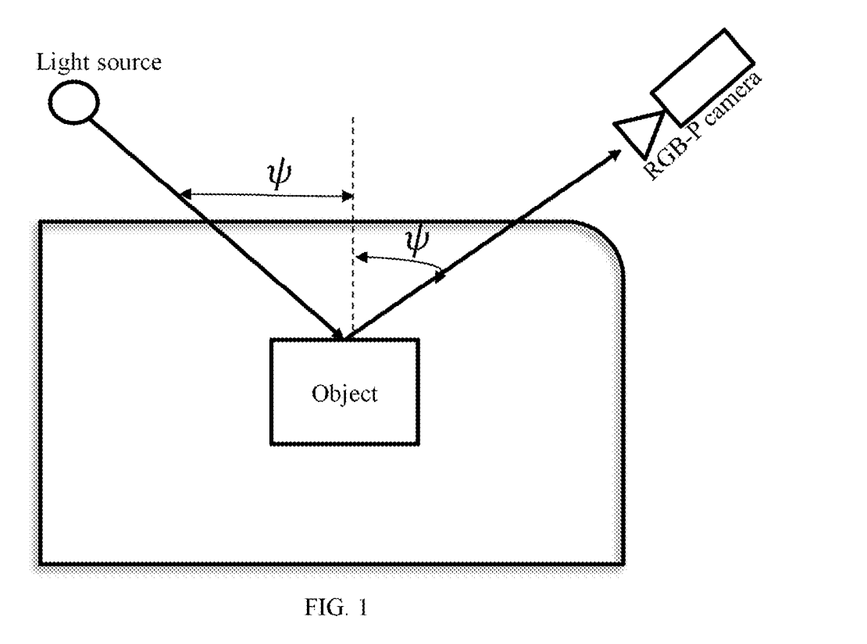
FIG. 1 illustrates a polarization image setup that may be used to capture RGB-P (Red Green Blue-Polarization) images, according to some embodiments of the present disclosure.

During image processing, polarization data is a key component which provides valuable information with respect to contents of the image. A polarization image setup that may be used to capture the RGB-P images is depicted in FIG. 1, and is explained below:

As in FIG. 1, unpolarized light from a controlled light source falls on an object of interest, and reflected light, which becomes polarized, is captured using a polarization camera from multiple polarization filter angles. ψ represents specular angle of incidence. Intensity $I_θ(x,y)$ of the reflected light at pixel location (x,y) of an M*N image (0≤x≤M, 0≤y≤N), the polarization angle θ and Stokes vector parameters ($S_0(x,y)$, $S_1(x,y)$, $S_2(x,y)$) are related as:

$$I_θ(x,y) = ½(S_0(x,y), S_1(x,y)\cos 2θ, S_2(x,y)\sin 2θ) \quad (1)$$

From equation (1), it is clear that to estimate the Stokes vector parameters, at least three sets of intensities corresponding to three polarization filter angles are necessary. During experiments conducted, a camera that instantly captures images at 'n' polarization angles was used, wherein the value of 'n' may be pre-configured as per requirements. For example, the value of n is 4 i.e. the polarization angles are θ=0°; 45°, 90°, and 135°. The Stokes parameters are estimated from these four intensity measurements as:

$$s_0(x,y) = \max(I_0(x,y) + I_{90}(x,y), I_{45}(x,y) + I_{135}(x,y))$$

$$s_1(x,y) = I_0(x,y) - I_{90}(x,y)$$

$$s_2(x,y) = I_{45}(x,y) - I_{135}(x,y) \quad (2)$$

The stoke parameters are then used to compute the intensity image I(x,y), which is analogous to conventional imaging intensity and corresponding DOP represented by ρ(x,y), as:

$$I(x, y) = s_0 \quad (3)$$

$$\rho(x, y) = \frac{\sqrt{s_1^2 + s_2^2}}{s_0} \quad (4)$$

Figure 2A:
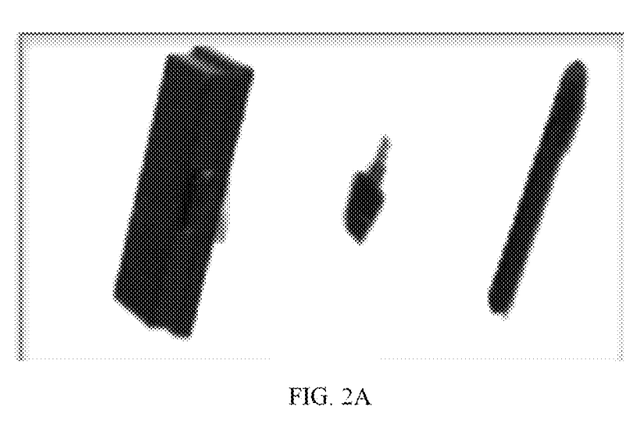
FIGS. 2A and 2B (collectively referred to as FIG. 2) depict an example of different objects of same color but different materials, on which intensity analysis and polarization analysis are performed, according to some embodiments of the present disclosure.
Figure 2B:
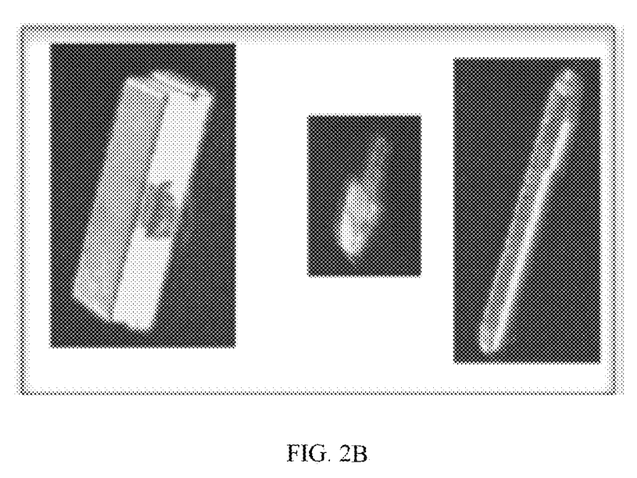

In order to illustrate advantage of a DoP based approach over other state of the art approaches, an example of different objects of same color but different materials was considered. This is depicted in FIGS. 2A and 2B. The objects under test were (i) coal placed on the plastic duster; (ii) key (Plastic+Black Metal) and (iii) knife (Plastic+Black Metal). FIG. 2A and FIG. 2B show the intensity image(I) and DOP image respectively, calculated using (3) and (4). As the objects were of similar color, it becomes difficult to identify different materials in the intensity image. However, one can observe clear distinction between different materials in the DOP image.

Figure 3A:
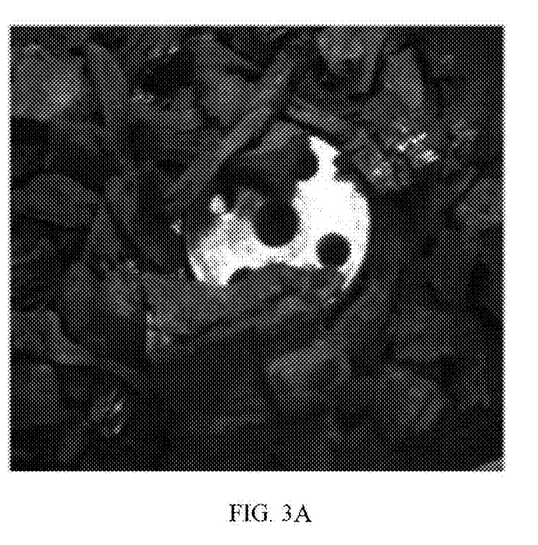
FIGS. 3A and 3B (collectively referred to as FIG. 3) depict an example of different objects of same color but different materials, on which intensity analysis and polarization analysis are performed, according to some embodiments of the present disclosure.
Figure 3B:
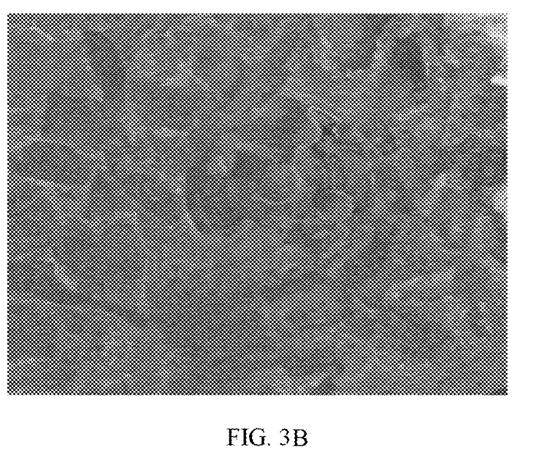

In another experiment, an image of a metal object placed in the background of coal (as shown in FIG. 3) was processed. From the DOP image (FIG. 3B), it becomes difficult to identify metal from the coal background, as both coal and metal do not significantly polarize the reflected light. Hence the DOP image for these materials are very similar. However, specular reflections of metal become clearly visible in the intensity image (FIG. 3A). Hence in this case, intensity image can be used to segment the metal object from the background. From the above examples, it is evident that for the inspection of end-products having small scale structural defects, the DOP image alone may suffice, but for raw material inspection a fusion of DOP and intensity images is necessary for efficient identification of foreign objects.

Referring now to the drawings, and more particularly to FIG. 4 through FIG. 10B, where similar reference characters denote corresponding features consistently throughout the figures, there are shown preferred embodiments and these embodiments are described in the context of the following exemplary system and/or method.

Figure 4:
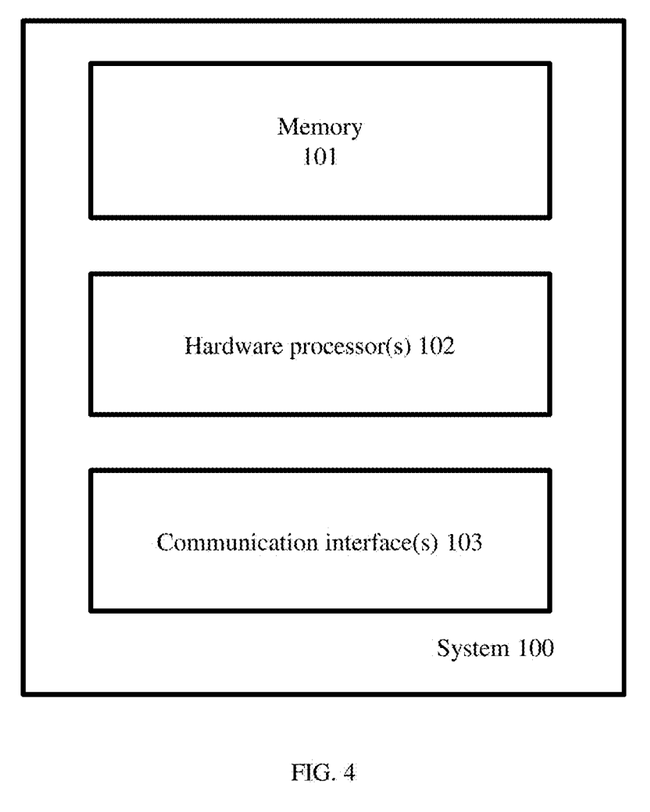
FIG. 4 illustrates a block diagram of a system for impurity detection, according to some embodiments of the present disclosure.

FIG. 4 illustrates a block diagram of a system for impurity detection, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the image processing based impurity detection being performed by the system 100. Various steps involved in the process of the image processing based impurity detection being performed by the system 100 are explained with description of FIG. 5. All the steps in FIG. 5 are explained with reference to the system of FIG. 4.

Figure 5:
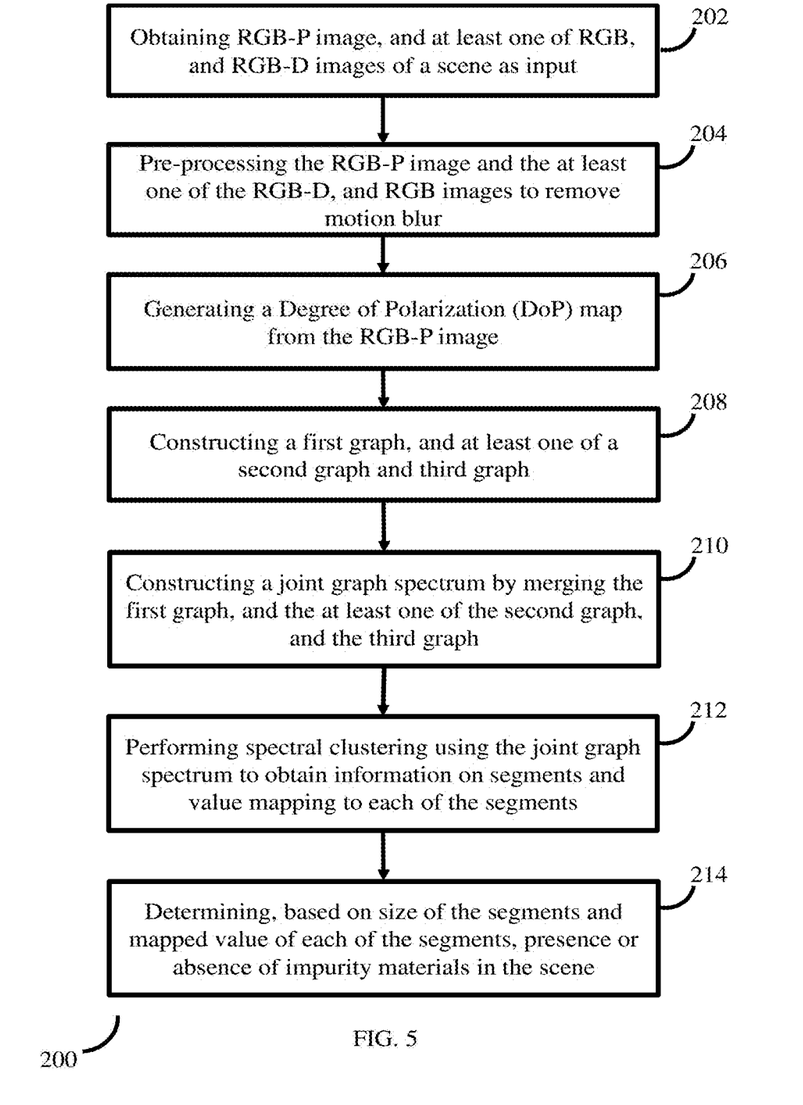
FIG. 5 is a flow diagram depicting steps involved in the process of impurity detection, by the system of FIG. 4, according to some embodiments of the present disclosure.

FIG. 5 is a flow diagram depicting steps involved in the process of impurity detection, by the system of FIG. 4, according to some embodiments of the present disclosure. In order to detect/identify presence of impurity in a raw material, images of a scene in which the raw material is present, are obtained/captured at step 502. The images captured are an RGB-P (polarization) image, and at least one of an RGB image and RGB-D (depth) image. The system 100 is configured to perform the impurity detection using any of the following combinations of images: a) RGB-P image and RGB image, b) RGB-P image and RGB-D image, and c) RGB image, RGB-P image, and RGB-D image.

Appropriate image capturing sensors are used by the system 100 to capture the RGB-P image, and at least one of the RGB-D image and the RGB image. For example, a polarization camera is used to capture the RGB-P image. Similarly, a depth camera is used to capture the RGB-D image, and an RGB camera to capture the RGB image. The RGB camera, RGB-D camera, and the RGB-P camera may or may not be part of the system 100. In an embodiment, the RGB camera, RGB-D camera, and the RGB-P are external to the system 100, and are connected to the system 100 via one or more suitable interfaces provided by the communication interface(s) 103.

The collected RGB-P and at least one of the RGB-D image, and the RGB image are further pre-processed at step 504 by the system 100 to remove motion blur. The system 100 may also perform one or more other image pre-processing techniques such as but not limited to noise reduction/removal, which is required to make the image(s) suitable for further processing.

The system 100 further generates at step 506, a Degree of Polarization (DoP) map of the scene, from the RGB-P image, by using any suitable image processing approach/technique. The DoP map includes polarization information pertaining to the scene being captured.

The system 100 then constructs at step 508 a first graph from the RGB-P image, a second graph from the RGB image, and a third graph from the RGB-D image. A graph 'G' comprising of N nodes is defined by a set $\{E, W\}$, where V represents a set of vertices or nodes, E represents a set of edges or connections between the nodes and $W \in \mathbb{R}^{N*N}$ denotes a weight matrix. In case of a digital image, the nodes are represented by pixel locations and edge signifies relationship between the pixels, wherein the edges may be directed or undirected depending on application. A higher value of $\omega(i,j)$ denotes a stronger correlation or higher similarity between values at pixel locations i and j, where $\omega(i,j)$ denotes $(i,j)^{th}$ element of matrix W. While constructing the graph, the system 100 uses a Gaussian kernel weighting function based approach for computing the weight matrix W as:

$$\omega(i,j) = \exp(-\|x_i - x_j\|_2^2/\sigma^2) \qquad (5)$$

where $\sigma$ is scaling factor, and $x_i$, $x_j$ denote pixel values at locations i and j respectively.

A Graph Lapacian 'L' is a matrix associated with the graphs, which contains all information about the graph. 'L' is a symmetric and positive semi-definite matrix provided that all entries of W are restricted to be positive. An unnormalized combination form of 'L' is expressed as $L = D - W$, where D is degree matrix which is a diagonal matrix with entry $d(i,j) = \Sigma_j \omega(i,j)$ along it's diagonal. Normalized L is expressed as:

$$L = D^{1/2}(D-W)D^{1/2} \qquad (6)$$

The graph Laplacian is used to compute/construct at step 510 the joint graph spectrum by merging the first graph, and at least one of the second graph and the third graph. For the graph with N nodes, eigendecomposition results in:

$$L = U\Lambda U^T \qquad (7)$$

where U is a square matrix $\in \mathbb{R}^{N*N}$, whose $i^{th}$ column is the eigenvector $u_i$ and $\Lambda$ is a diagonal matrix with eigenvalues $\lambda_i$s along diagonal. The eigenvalues are non-negative and arranged in the ascending order. These values represent the graph frequencies and U encapsulates the eigenvectors corresponding to these graph frequencies.

Signals residing in this graph structure are termed as graph signals s. For the images being processed, the graph signals are pixel values sitting on the nodes of the graph with one pixel on each node. Graph Signal Processing (GSP) is an approach used for processing such signals by considering graph topology. Graph Total Variation (GTV) is a concept associated with GSP, which denotes total variation of the signal with respect to underlying graph. GTV is expressed as:

$$GTV = s^T L_S \qquad (8)$$

where L is the graph Laplacian and s is the graph signal.

GTV is also known as graph Laplacian quadratic term. A small value of GTV denotes less variation of the signal over the graph, thereby making the signal smooth with respect to the underlying graph structure, which also means that the graph is representing the correlations in the signal well. A high value of GTV represents more variations of the signal with respect to the graph, which suggests a mismatch between the graph structure and the signal.

The system 100 constructs a joint graph spectrum by merging the first graph, and at least one of the second graph and the third graph. If all the three images are captured (i.e. the RGB image, RGB-P image, and the RGB-D image), then the system 100 merges graphs from all the three images, to construct the joint graph spectrum (represented as U*), such that U* is closer to $U_1$ (i.e. spectrum of the first graph), and is smooth with respect to the second graph and the third graph. The term 'closer' in this context is refers to extent of overlap between the joint graph spectrum and the spectrum of the first graph, wherein if the extent of overlap exceeds a threshold of overlap, then the U* is determined as closer to $U_1$ by the system. In an embodiment, the value of the threshold of overlap is configured with the system 100. The system 100 enforces the smoothness by minimizing GTV of the second graph and the third graph. This results in the optimization formulation:

$$\min_{U^*} \|U^* - U_1\|_2^2 + \mu_2 tr(U^{*T} L_2 U^*) + \ldots + \mu_n tr(U^{*T} L_n U^*) \qquad (9)$$

where $\mu_n$, $\mu_2$ are regularization parameters, $L_2, \ldots L_n$ are the graph Laplacians of the second image, ... $n^{th}$ image, and tr(A) represents trace of matrix A. The regularization parameters determine the trade off between the data fidelity term and the graph Laplacian quadratic term, and hence can be tuned appropriately to assign different importance to the sources for clustering. Here the term 'source' refers to the camera used for capturing the images (RGB, RGB-D, and RGB-P images). A closed form solution for this optimization problem, is expressed as:

$$U^* = (I_N + \mu_2 L_2 + \ldots + \mu_n L_n) \qquad (10)$$

where $I_N$ denotes identity matrix of size N. The system 100 can be configured to takes first K eigenvectors of the joint graph spectrum for performing the spectral clustering at step 512, using a K-means algorithm.

By performing the spectral clustering, the system 100 identifies segments present in the joint graph spectrum. Further, by mapping the segments with the DoP map, the system 100 identifies values from the DoP map that match each of the segments. The identified values are then assigned to each of the segments. At this stage, the system 100 also determines size of each of the segments.

In an embodiment, the system 100 may use a background subtraction method instead of the joint graph based approach, if required. When the background subtraction based approach is used, the system 100 performs a background modeling to construct a background image of the scene for which at least one real-time image (RGB, RGB-D, or RGB-P) has been obtained. The system 100 then compares the background image and the at least one real-time image, and during this comparison, the background image is subtracted from the at least one new image. What is left after the subtraction is difference between the background image and the at least one real-time image. The difference between the background image and the at least one real-time image is further subject to threshold and segmentation, and result of the threshold and segmentation i.e. contours of segments and polarization values, are then sent for fusion.

Further, the system 100 determines at step 514 the presence of impurity materials in the scene, based on the size of the segments and the values of each of the segments. In order to determine the presence of one or more impurity materials in the scene, the system 100 compares size of each of the segments with a threshold of size, and the values of each of the segments with a threshold of polarization value. If at least the size of the segment or the value exceeds the corresponding threshold, the system 100 determines that an impurity material is present in the scene.

Upon detection of the impurity material, the system 100 may trigger an alert, and may send identified details of the impurity material (such as but not limited to the image, size of the segments, and values of the segments) to the user via an appropriate medium(s). In an example, the details are displayed to the user via an appropriate interface on a computer monitor. In another example, an SMS alert may be sent to one or more authorize personnel if the presence of impurity material is identified/detected.

Figure 6:
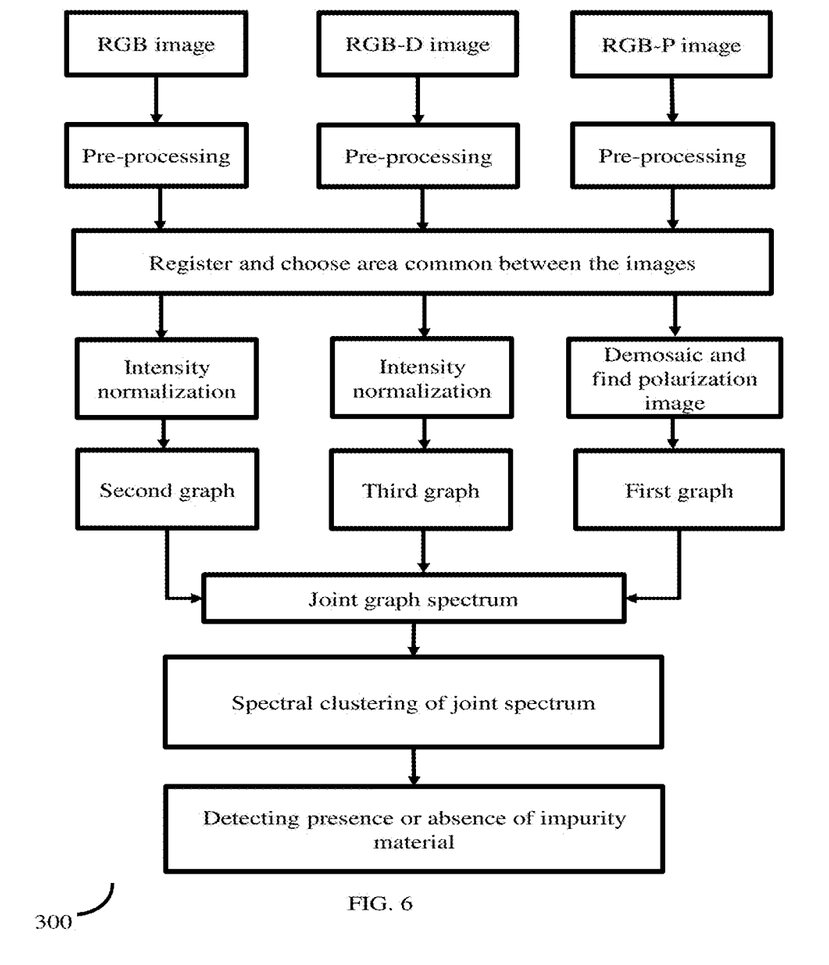
FIG. 6 is a representation of the steps in FIG. 5, according to some embodiments of the present disclosure.

In an embodiment, the steps in method 200 may be performed in the same order as depicted, or in any alternate order that is technically feasible. In another embodiment, one or more steps in method 200 may be omitted. A representation of the steps of method 200 are depicted in FIG. 6.

Figure 7A:
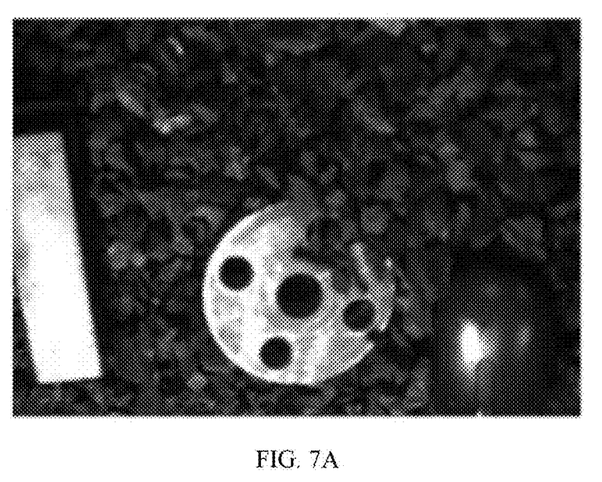
FIGS. 7A and 7B depict example graphical representations of intensity image and Degree Of Polarization (DoP) image respectively, of different foreign objects mixed with coal based raw material, according to some embodiments of the present disclosure.
Figure 7B:
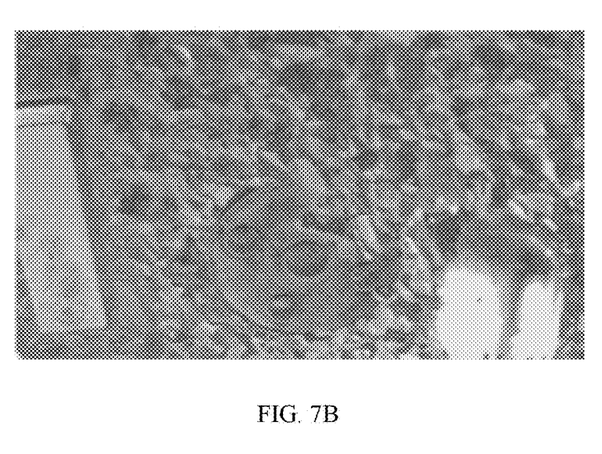

Experimental Results:

Experiment was carried out to determine capability of the system 100 to perform inspection of raw material using the graph based fusion technique for foreign object detection. For this experiment, different foreign objects were mixed with a native material. Intensity and DOP images obtained for three different foreign objects mixed with coal based raw material are shown in FIGS. 7A and 7B respectively. The foreign objects are: (i) rough plastic duster; (ii) metal plate and (iii) computer mouse (smooth surface). It can be noticed from FIG. 7B that the DOP values for the smooth mouse surface are more compared to the plastic duster, while they are nearly same for metal and coal.

Figure 8A:
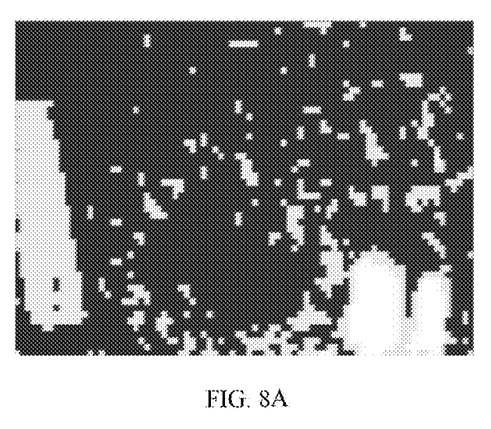
FIGS. 8A and 8B depict example graphical representations of segmentation of DoP image of the different foreign objects mixed with coal based raw material, using spectral clustering and K-means clustering respectively, according to some embodiments of the present disclosure.
Figure 8B:
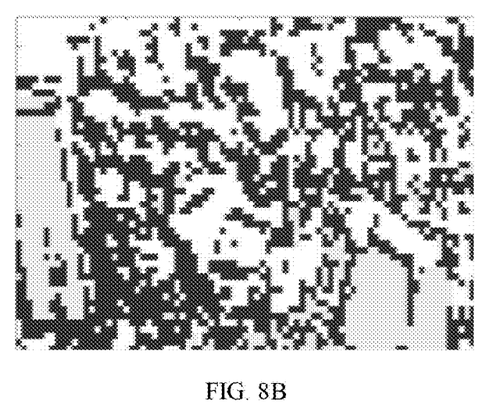

The results for object segmentation using the DOP image are depicted in FIGS. 8A and 8B. Object segmentation was carried out using spectral clustering (FIG. 8A), and K-means (FIG. 8B) for comparative analysis. Spectral clustering uses the DOP image for graph construction using (5) with $\sigma=0.01$. It can be seen that spectral clustering correctly assigns different clusters to the different objects (mouse, duster and coal) as compared to K-means technique. The K-means algorithm is not able to differentiate well between the foreign objects and background coal. The mouse and the duster are put in same cluster and the background cluster for coal has more error compared to the former method. It is to be noted that the metal object is not detected by both the methods since it is not visible in the DOP image.

Figure 9A:
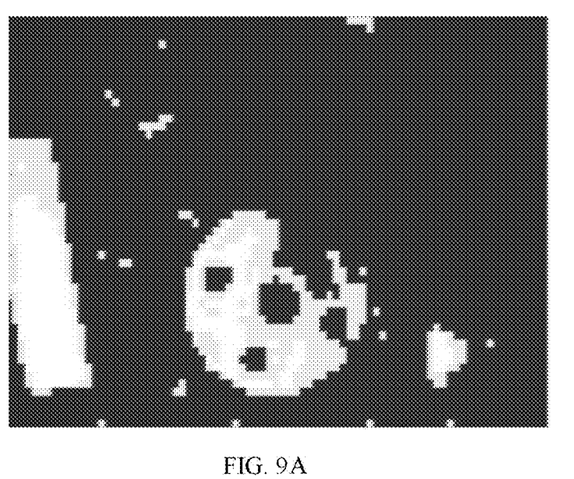
FIGS. 9A and 9B depict example graphical representations of segmentation of intensity image of the different foreign objects mixed with coal based raw material, using spectral clustering and K-means clustering respectively, according to some embodiments of the present disclosure.
Figure 9B:
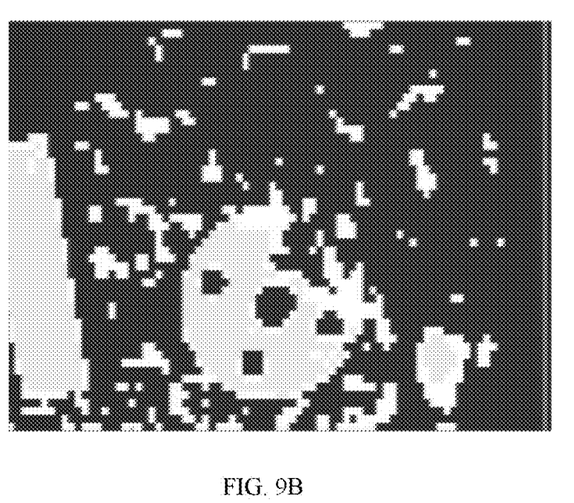

The metal object could be clearly segmented from the Intensity image. FIGS. 9A and 9B shows result of object segmentation using the intensity image with Spectral clustering ($\sigma=0.01$) and K-means respectively. As seen the metal becomes visible in the intensity image for both techniques, but K-means approach has more background error compared to the Spectral clustering. It can be seen from FIG. 8 and FIG. 9 that DOP image helps in detecting dielectric based foreign objects such as mouse and plastic duster from the background coal. However, the metal object get faded away with the background coal, since both metal and coal do not polarize the light. On the other hand, the specular reflections of metal helps to segment the metal object in the intensity image. However, due to identical color, the black mouse gets faded with the background in the intensity image. Hence there is a need for fusing the information from both these heterogeneous sources for more robust detection of foreign objects.

Figure 10A:
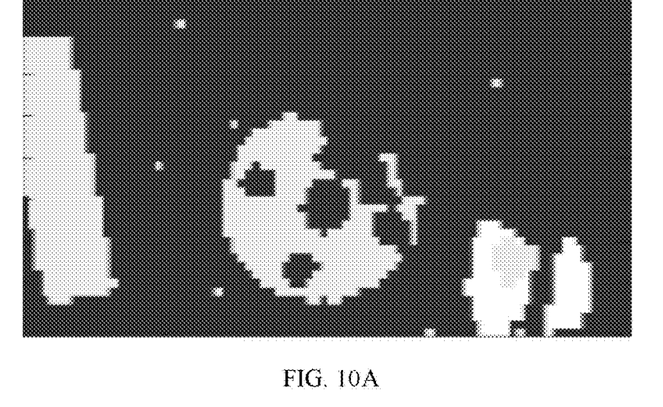
FIGS. 10A and 10B depict example graphical representations of fusion of information from the DoP image and intensity images using joint spectral clustering and K-means clustering respectively, according to some embodiments of the present disclosure.
Figure 10B:
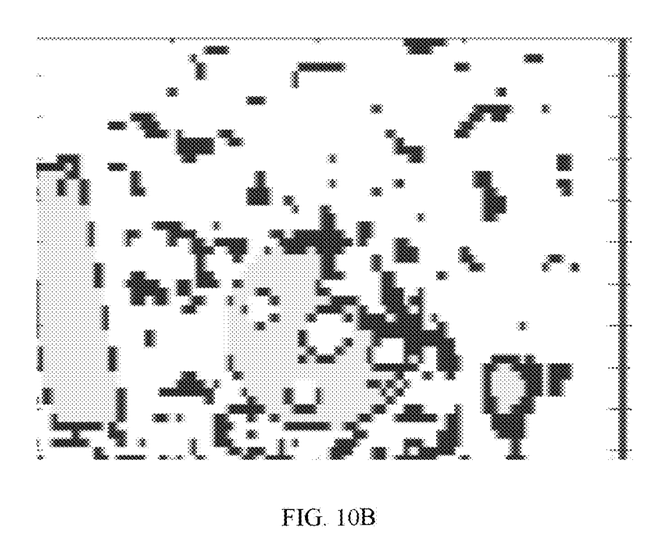

Information fusion is carried out using the proposed joint spectral clustering. Individual graphs are constructed for DOP (with $\sigma=0.01$) and intensity (with $\sigma=0.1$) image and a joint spectrum is computed using (11). The result of object segmentation using the proposed technique is presented in FIG. 10A. For comparison purpose, the result obtained with joint K-means (K-means using both DOP and intensity) are presented in FIG. 10B. It may be noticed that the graph fusion approach used proposed technique is able to identify all the foreign objects of interest. However, joint K-means is not able to efficiently cluster all the three foreign objects from the background.

In order to quantify and validate the performance of our\proposed technique, 20 different sets of data was evaluated for foreign object detection using different combinations of foreign objects. The objects used were 4 metal objects and 4 dielectrics, having different DoP values.

Average clustering for the object segmentation results obtained for the 20 sets of data is given in Table. 1. Ground truth for foreign object segmentation for these images was generated manually using a Pixel Annotation Tool. Clustering in this scenario is seen as an object segmentation problem for foreign object detection from native background material. The background having the native material results in dominant cluster and the remaining clusters are assigned to the foreign objects. Clustering was carried out for 3 cases: (i) using DOP image alone, (ii) using intensity image alone, (iii) using both DOP and intensity images(fusion). Each clustered pixel was then compared with the manually annotated ground truth for calculating clustering performance. Performance of the segmentation and classification approach used by the system 100 was evaluated using four different metrics namely, Precision, Recall, Specificity and overall classification Accuracy.

TABLE 1

| Accuracy | Specificity | Recal | Preci | Metrics | | |
|---|---|---|---|---|---|---|
| 0.684 | 0.850 | 0.630 | 0.927 | Native | K-means | DoP |
|  | 0.630 | 0.850 | 0.439 | foreign |  |  |
| 0.888 | 0.785 | 0.922 | 0.927 | Native | Spectral |  |
|  | 0.922 | 0.785 | 0.768 | Foreign |  |  |
| 0.802 | 0.829 | 0.804 | 0.934 | Native | K-means | Intensity |
|  | 0.804 | 0.829 | 0.642 | Foreign |  |  |
| 0.882 | 0.713 | 0.931 | 0.917 | Native | Spectral |  |
|  | 0.931 | 0.713 | 0.854 | Foreign |  |  |

TABLE 1-continued

| Accuracy | Specificity | Recal | Preci | Metrics | | |
|---|---|---|---|---|---|---|
| 0.788 | 0.859 | 0.769 | 0.944 | Native | K-means | DoP + Intensity |
|  | 0.769 | 0.859 | 0.602 | Foreign |  |  |
| 0.947 | 0.846 | 0.980 | 0.951 | Native | Graph fusion approach |  |
|  | 0.980 | 0.846 | 0.929 | Foreign |  |  |

From Table 1, it can be seen that for cases (i) and (ii), it is observed that spectral clustering has better performance than K-means. The average accuracy using spectral clustering for individual DOP and intensity images is 88.8% and 88.2% respectively. On the other hand, K-means accuracy is limited to 68.4% and 80.2%. This is due to the fact that the graph is able to capture the correlation between the data elements better, which is crucial for clustering. For case (iii), considering DOP and intensity images together (fusion), the joint spectral clustering based approach has higher overall accuracy of 94.7% as compared to the joint K-means approach which is 78.8%. It is also evident that this fused approach performs better than cases (i) and (ii). The joint spectral clustering based approach is able to fuse the complimentary information captured by DOP and intensity images for improved detection of foreign objects.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives. CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method of image processing for impurity identification, comprising:
   obtaining, via one or more hardware processors, an RGB-P (Red-Green-Blue Polarization) image and at least one of an RGB (Red-Green-Blue) image, and RGB-D (Red-Green-Blue Depth) image, of a scene, as inputs;
   pre-processing the obtained RGB-P image and the at least one RGB and RGB-D image to remove motion blur, via the one or more hardware processors;
   generating a Degree of Polarization (DoP) map from at least one plane of the RGB-P image, via the one or more hardware processors;
   constructing a first graph and at least one of a second graph and a third graph, via the one or more hardware processors, wherein the first graph is constructed for the DoP map, the second graph is constructed for the RGB image, and the third graph is constructed for the RGB-D image;
   constructing a joint graph spectrum by merging the first graph, and the at least one of the second graph and the third graph, via the one or more hardware processors;
   performing spectral clustering using the joint graph spectrum, comprising:
      generating a plurality of segments from the joint graph spectrum; and
      mapping values of each of the plurality of segments from the DoP map; and
      determining, based on size of each of the plurality of segments and mapped value of each of the plurality of segments, presence or absence of one or more impurity materials in the scene, via the one or more hardware processors.

2. The processor implemented method as claimed in claim 1, wherein, the joint graph spectrum is constructed such that overlap of the joint graph spectrum and a graph spectrum of the first graph exceeds a threshold of overlap, and the joint graph spectrum is smooth with respect to the second graph and the third graph.

3. The processor implemented method as claimed in claim 1, wherein determining the presence or absence of the one or more impurity materials based on the size of the segments and the values of the segments comprises:
   comparing the size and values of each of the segments with a threshold of size of segments and a threshold of polarization values of segments respectively; and
   determining the presence of the one or more impurity materials if at least one of the size of the segments or value of segments exceed the threshold of size of segments and a threshold of polarization values of segments.

4. A system of image processing for impurity identification, comprising:
   one or more hardware processors;
   one or more communication interfaces; and
   a memory, wherein the memory comprises a plurality of instructions, which when executed, cause the one or more hardware processors to:
      obtain an RGB-P (Red-Green-Blue Polarization) image and at least one of an RGB (Red-Green-Blue) image, and RGB-D (Red-Green-Blue Depth) image, of a scene, as inputs;
      pre-process the obtained RGB-P image and the at least one RGB and RGB-D image to remove motion blur;
      generate a Degree of Polarization (DoP) map from at least one plane of the RGB -P image;
      construct a first graph and at least one of a second graph and a third graph, wherein the first graph is constructed for the DoP map, the second graph is constructed for the RGB image, and the third graph is constructed for the RGB-D image;
      construct a joint graph spectrum by merging the first graph, and the at least one of the second graph and the third graph;
      perform spectral clustering using the joint graph spectrum, by:
         generating a plurality of segments from the joint graph spectrum; and
         mapping values of each of the plurality of segments from the DoP map; and
      determine based on size of each of the segments and mapped value of each of the segments, presence or absence of one or more impurity materials in the scene.

5. The system as claimed in claim 4, wherein the system constructs the joint graph spectrum such that overlap of the joint graph spectrum and a graph spectrum of the first graph exceeds a threshold of overlap, and the joint graph spectrum is smooth with respect to the second graph and the third graph.

6. The system as claimed in claim 4, wherein the system determines the presence or absence of the one or more impurity materials based on the size of the segments and the values of the segments by:
   comparing the size and values of each of the segments with a threshold of size of segments and a threshold of polarization values of segments respectively; and
   determining the presence of the one or more impurity materials if at least one of the size of the segments or value of segments exceed the threshold of size of segments and a threshold of polarization values of segments.

7. A non-transitory computer readable medium for image processing for impurity identification, wherein the non-transitory computer readable medium performs the image processing by:
   obtaining, via one or more hardware processors, an RGB-P (Red-Green-Blue Polarization) image and at least one of an RGB (Red-Green-Blue) image, and RGB-D (Red-Green-Blue Depth) image, of a scene, as inputs;
   pre-processing the obtained RGB-P image and the at least one RGB and RGB-D image to remove motion blur, via the one or more hardware processors;
   generating a Degree of Polarization (DoP) map from at least one plane of the RGB -P image, via the one or more hardware processors;
   constructing a first graph and at least one of a second graph and a third graph, via the one or more hardware processors, wherein the first graph is constructed for the DoP map, the second graph is constructed for the RGB image, and the third graph is constructed for the RGB-D image;
   constructing a joint graph spectrum by merging the first graph, and the at least one of the second graph and the third graph, via the one or more hardware processors;
   performing spectral clustering using the joint graph spectrum, comprising:
      generating a plurality of segments from the joint graph spectrum; and
      mapping values of each of the plurality of segments from the DoP map; and
      determining, based on size of each of the plurality of segments and mapped value of each of the plurality of segments, presence or absence of one or more impurity materials in the scene, via the one or more hardware processors.

8. The non-transitory computer readable medium as claimed in claim 7, wherein the non-transitory computer readable medium constructs the joint graph spectrum such that overlap of the joint graph spectrum and a graph spectrum of the first graph exceeds a threshold of overlap, and the joint graph spectrum is smooth with respect to the second graph and the third graph.

9. The non-transitory computer readable medium as claimed in claim 7, wherein the non-transitory computer readable medium determines the presence or absence of the one or more impurity materials based on the size of the segments and the values of the segments, comprises:
   comparing the size and values of each of the segments with a threshold of size of segments and a threshold of polarization values of segments respectively; and
   determining the presence of the one or more impurity materials if at least one of the size of the segments or value of segments exceed the threshold of size of segments and a threshold of polarization values of segments.

\* \* \* \* \*